Feb. 13, 1951     D. V. SARBACH ET AL     2,541,550
BLEND OF ISOOLEFIN-DIOLEFIN AND POLYCHLOROPRENE SYNTHETIC
RUBBERS FOR ADHERING ISOOLEFIN-DIOLEFIN
RUBBER TO OTHER MATERIALS
Filed Jan. 3, 1949
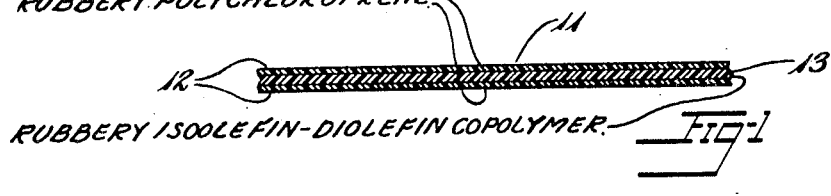
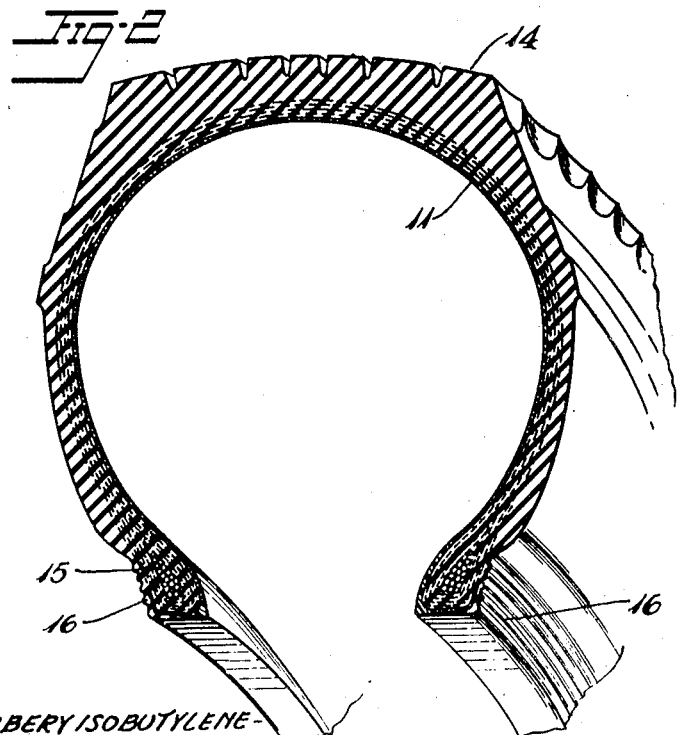
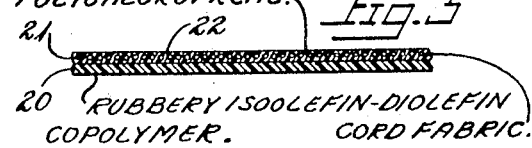

Patented Feb. 13, 1951

2,541,550

UNITED STATES PATENT OFFICE 2,541,550

BLEND OF ISOOLEFIN-DIOLEFIN AND POLY-CHLOROPRENE SYNTHETIC RUBBERS FOR ADHERING ISOOLEFIN-DIOLEFIN RUBBER TO OTHER MATERIALS

Donald V. Sarbach, Cuyahoga Falls, and George P. Loomis, Silver Lake, Ohio, assignors to The B. F. Goodrich Company, New York, N. Y., a corporation of New York Application January 3, 1949, Serial No. 68,824

11 Claims. (Cl. 154—139)

This invention relates to adhesive compositions for adhering rubbery compositions to each other or to filamentary materials and to methods of using such adhesives in the building of composite articles of rubbery materials, such as tires and the like.

It is an object of this invention to provide liquid or solid adhesive compositions which may be used for adhering rubbery materials.

It is a further object to provide an adhesive for adhering isoolefin-diolefin copolymer synthetic rubber to other rubbery materials or to filamentary materials.

It is also an object to provide an adhesive for treating a filamentary material which may be used as an interposed layer between layers of rubbery materials which are to be adhered together, and especially between a layer of isoolefin-diolefin copolymer synthetic rubber and a layer of any other rubbery material.

Other objects will be apparent from the description which follows.

These objects are attained by preparing an adhesive comprising a homogeneous blend of two or more rubbery materials and preferably a blend of isoolefin-diolefin copolymer synthetic rubber with neoprene. This blend may be mixed with any conventional vulcanizing, accelerating, and reinforcing ingredients to form a solid adhesive composition which may be used in that condition or may be dissolved in a suitable solvent to form a liquid cement. By interposing such an adhesive composition between an isoolefin-diolefin copolymer synthetic rubber and another rubbery material or a filamentary material, then vulcanizing the composite product, a good bond is achieved between the materials.

The isoolefin-diolefin copolymer synthetic rubbers included in this invention are known as "Butyl" rubber and are rubbery hydrocarbon copolymers prepared by low temperature copolymerization of a major proportion of an isoolefin having from four to seven carbon atoms with a minor proportion of an open-chain or linear conjugated diolefin having from four to eight carbon atoms. The copolymer preferably contains from 80 to 99½ parts by weight of an isomonoolefin such as isobutylene or ethyl methyl ethylene copolymerized with from ½ to 20 parts by weight of a diolefin such as isoprene; butadiene-1,3; piperylene; 2,3-dimethyl butadiene-1,3; 1,2-dimethyl butadiene-1,3; 1,3-dimethyl butadiene-1,3; 1-ethyl butadiene-1,3; 1,4-dimethyl butadiene-1,3; the total monomeric material in the preferred mixture amounting to 100 parts by weight. The copolymerization may be effected by the usual method of copolymerizing such monomers as disclosed in detail in U. S. Patents 2,356,128, 2,356,129, and 2,356,130 to Thomas and Sparks. Preferably a monomeric mixture containing from 95 to 99% by weight of an isomonoolefin such as isobutylene and from 1 to 5% of a diolefin such as isoprene or butadiene-1,3 is used. These synthetic rubbers are known to the trade as "GR-I," "Butyl A," "Butyl B," "Butyl C," and "Flexon."

The neoprene blended with the "Butyl" rubber is a rubbery polymer of a 2-chlorobutadiene-1,3, commonly known as polychloroprene, or rubbery polymers of 2,3-dichlorobutadiene-1,3 or rubbery copolymers of a chlorobutadiene-1,3 with monomers copolymerizable therewith, such as isoprene, butadiene-1,3, styrene, acrylonitrile, etc. The typical neoprenes are known to the trade as "Neoprene GN," "Neoprene KN," "Neoprene I," "GR-M," and "GR-M-10." The rubbery homopolymer of chloroprene itself is preferred for the purpose of this invention.

It is well known that it is difficult to obtain satisfactory adhesion between isoolefin-diolefin copolymer synthetic rubber and other American-made or natural rubbers. However, with the adhesives of this invention, good adhesion is made possible between vulcanizable isoolefin-diolefin copolymer synthetic rubber and natural rubber or any of the sulfur-vulcanizable American-made rubbers, with no necessity of pre-vulcanizing one of the rubbers before adhesion. These rubbers can be adhered one to the other simply by placing one of the adhesive compositions of this invention between the unvulcanized rubber layers and then vulcanizing the composite structure by the application of heat and pressure.

One embodiment of our invention is shown in the drawing in which:

Fig. 1 is a fragmentary view in section of a lining construction embodying this invention suitable for use in a pneumatic tire;

Fig. 2 is a fragmentary perspective view, broken away in section, of a pneumatic tire casing embodying the liner of Fig. 1; and, Fig. 3 is a fragmentary view in section of another embodiment of our invention.

The preparation of typical adhesive compositions within the scope of this invention is described in the following specific examples.

*Example I*

The following ingredients were mixed thoroughly on a roll mill:

| | Parts by weight |
|---|---|
| Isobutylene-isoprene copolymer 97:3 | 50 |
| Polychloroprene | 50 |
| Zinc oxide | 5 |
| Ferric oxide | 42 |
| Carbon black | 15 |
| Magnesium oxide | 2 |
| Sulfur | 1 |
| Stearic acid | 1 |
| Cumar resin | 5 |
| Mercaptobenzothiazole | 0.5 |
| Tetra methyl thiuram disulfide | 0.4 |
| Dodecanoic acid | 4 |

This composition was calendered into a solid, flexible tie gum or strip. A strip of adhesive was then placed between a layer of a natural rubber composition and a layer of isoolefin-diolefin copolymer synthetic rubber composition, both of which contained conventional compounding ingredients including sulfur and a vulcanizing agent and the composite structure vulcanized by the application of heat and pressure under conventional conditions. The resulting bond had a tensile strength of 18 pounds per linear inch.

*Example II*

| | Parts by weight |
|---|---|
| Isobutylene-isoprene copolymer (97.3) | 50 |
| Polychloroprene | 50 |
| Litharge | 5 |
| Ferric oxide | 84 |
| Magnesium oxide | 2 |
| Sulfur | 1 |
| Stearic acid | 1 |
| Mercaptobenzothiazole | 0.5 |
| Tetra methyl thiuram disulfide | 0.4 |
| Dodecanoic acid | 4 |

These ingredients were mixed on a roll mill and the resulting composition was dispersed in a mixture of toluene and ethyl acetate to form a cement. This cement was spread on the surfaces of a layer of isoolefin-diolefin copolymer synthetic rubber and a layer of butadiene-styrene copolymer synthetic rubber both of which contained conventional compounding ingredients including sulfur and accelerators, dried, and the coated surfaces were then placed together and vulcanized conventionally by heating at an elevated temperature and pressure. The bond had a tensile strength of 15 pounds per linear inch.

The adhesive of this invention has been found to be of particular value in the manufacture of the so-called "tubeless" tire in which the tire casing serves as the air container without the necessity for using an inner tube. Inasmuch as the rubbery material normally employed in a tire casing is either crude rubber or a rubbery butadiene-styrene copolymer through which air diffuses quite readily, it is necessary to employ a barrier layer of material impervious to air to prevent loss of pressure. "Butyl" rubber has been found to be eminently satisfactory for this purpose except for the problem of adhering it to the rubbery material used in the remainder of the tire casing and it is this problem which can be met by the adhesive composition of the present invention.

As shown in Fig. 1 of the drawing, a composite liner 11 is constructed from a layer of "Butyl" rubber 13 approximately .050 inch thick disposed between two layers 12 of the composition of Example I above, each approximately .004 inch thick. Layer 12 of course contains the usual compounding ingredients including sulfur and an accelerator.

The tire casing shown in Fig. 2 is then constructed in the usual manner employing liner 11 as the first ply and using crude rubber as the rubbery material in the remainder of the carcass and tread 14. Liner 11 is turned back over bead 15 and bead cushions 16 of vulcanizable crude rubber composition are applied along the outer wall. The completed assembly is then vulcanized by heating under pressure in a mold in the usual manner.

Another embodiment of my invention is shown in Fig. 3 in which a layer 20 of vulcanizable "Butyl" rubber, containing the usual compounding ingredients is placed in face-to-face contact with a layer of cotton cord fabric 21 which has been previously coated or impregnated with the cement 22 of Example II and dried. The fabric layer may then be utilized as the inner fabric ply of a tire casing, serving to bond the "Butyl" rubber lining 20 to the crude rubber composition of the remainder of the tire carcass after vulcanization of the composite structure. The strength of the bond is approximately the same as the strength of the bond obtained in Example I above.

Similar results are obtained in using the adhesive composition of this invention for bonding rubber isoolefin-diolefin copolymers to other filamentary materials and to other sulfur-vulcanizable rubbery materials such as rubbery polymers of butadiene-1,3; isoprene; piperylene; 2,3-dimethyl butadiene-1,3; and the like; or rubbery copolymers made by copolymerizing any of these materials with each other or with other copolymerizable ethylenic monomers such as styrene, acrylonitrile, methyl acrylate, methyl methacrylate, or the like.

The relative proportions of rubbery isoolefin-diolefin copolymer and rubbery polychloroprene in the mixture may be varied over a wide range, from about 80:20 to 20:80 by weight, but best results are obtained using approximately equal parts by weight, the preferred range of proportions being from 40:60 to 60:40 by weight. Pigmentation is not essential to obtain adhesive qualities, but iron oxide (either ferrous or ferric) in proportions from 20 to 100 parts by weight for each 100 parts by weight of the mixture of rubbery materials does facilitate calendering and handling of the blend. Other pigments and vulcanizing agents, etc. may be added as desired. Tackifying resins in proportions from 1 to 10 parts by weight may be added to improve the tack of the tie gum compositions. Such resins may be hard cumar, rosin, pine tar, coal tar pitch, or the like. Cements made as herein disclosed may be further enhanced by the addition of hexamethylene diisocyanate or resorcinol formaldehyde.

These adhesives have made it possible to adhere an isoolefin-diolefin copolymer synthetic rubber to either crude or American-made rubber without the necessity of prevulcanizing either of the rubbers, as was formerly the case. Further variations and modifications may be effected within the spirit and scope of the invention as defined in the appended claims.

We claim:

1. A flexible, vulcanizable, composite structure comprising a layer of crude rubber; a layer comprising a rubbery copolymer of a major proportion of an isoolefin having from 4 to 5 carbon atoms with a minor proportion of an open-chain conjugated diolefin having from 4 to 6 carbon atoms; and an interposed layer of a solid, flexible adhesive in direct adhering contact with each of the aforesaid layers comprising from 80 to 20 parts by weight of a rubbery copolymer of a major proportion of an isoolefin having from 4 to 7 carbon atoms with a minor proportion of an open-chain conjugated diolefin having from 4 to 8 carbon atoms, and from 20 to 80 parts by weight of a rubbery polymer of a chlorobutadiene-1,3.

2. A flexible, vulcanizable, composite structure comprising a layer of crude rubber; a layer comprising a rubbery copolymer of a major proportion of an isoolefin having from 4 to 5 carbon atoms with a minor proportion of an open-chain conjugated diolefin having from 4 to 6 carbon atoms; and an interposed layer of a solid, flexible adhesive in direct adhering contact with each of the aforesaid layers comprising from 60 to 40 parts by weight of a rubbery copolymer of a major proportion of an isoolefin having from 4 to 7 carbon atoms with a minor proportion of an open-chain conjugated diolefin having from 4 to 8 carbon atoms, and from 40 to 60 parts by weight of a rubbery polymer of a chlorobutadiene-1,3.

3. A flexible, vulcanizable, composite structure comprising a layer of a rubber, a layer of an isoolefin-diolefin copolymer synthetic rubber, and an interposed layer of a solid, flexible adhesive composition in direct adhering contact with each of the aforesaid layers comprising 50 parts by weight of a copolymer of isobutylene and isoprene, 50 parts by weight of polychloroprene, 42 parts by weight of iron oxide, and 1 part by weight of sulfur.

4. A flexible vulcanizable, composite structure comprising a layer of a rubber, a layer of a copolymer of a major proportion of isobutylene with a minor proportion of isoprene, and an interposed layer of a filamentary material treated with an adhesive cement composition comprising from 80 to 20 parts by weight of a copolymer of isobutylene and isoprene, 20 to 80 parts by weight of polychloroprene, 20 to 100 parts by weight of iron oxide, and ½ to 2 parts by weight of sulfur, said interposed layer being in direct adhering contact with each of the aforesaid layers.

5. A flexible, vulcanizable inner liner for a tire comprising a body of rubbery copolymer of a major proportion of isobutylene with a minor proportion of isoprene and on either side of said body and in direct adhering contact therewith a layer comprising from 40 to 60 parts by weight of polychloroprene and from 60 to 40 parts by weight of a copolymer of a major proportion of isobutylene and a minor proportion of isoprene.

6. A pneumatic tire having in combination a carcass comprising a sulfur-vulcanized rubbery material and an inner liner ply, said inner liner ply comprising a rubbery copolymer of a major proportion of an isoolefin having from 4 to 7 carbon atoms with an open-chain conjugated diolefin having from 4 to 8 carbon atoms, and a bonding ply interposed between and in direct adhering contact with said liner ply and said carcass, said bonding ply comprising a homogeneous mixture of 20 to 80 parts by weight of said rubbery copolymer with 80 to 20 parts by weight of a rubbery polymer of a chlorobutadiene-1,3, said plies and carcass being bonded together by vulcanization.

7. A method of adhering a rubbery copolymer of a major proportion of an isoolefin having from 4 to 7 carbon atoms with a minor proportion of an open-chain conjugated diolefin having from 4 to 8 carbon atoms to an unvulcanized rubber comprising interposing between and in direct contact with layers of said rubbery copolymer and said rubber a preformed, solid layer of a vulcanizable adhesive composition which comprises substantially equal parts of said rubbery copolymer and a polymer of a chlorobutadiene-1,3; and heating the composite product to vulcanize the vulcanizable constituents.

8. A method of adhering an isoolefin-diolefin copolymer synthetic rubber to crude rubber comprising the steps of placing between and in direct contact with layers of said unvulcanized isoolefin-diolefin copolymer synthetic rubber and said unvulcanized crude rubber an interposed preformed, solid layer of a vulcanizable adhesive composition which comprises substantially equal parts of a copolymer of isobutylene and isoprene and a polymer of chlorobutadiene-1,3; and heating the composite product to vulcanize the vulcanizable constituents.

9. A method of adhering an isoolefin-diolefin copolymer synthetic rubber to crude rubber comprising the steps of placing between and in direct contact with layers of said unvulcanized isoolefin-diolefin copolymer synthetic rubber and unvulcanized crude rubber an interposed preformed, solid layer of an adhesive composition comprising from 40–60 parts by weight of a copolymer of isobutylene and isoprene, and from 40–60 parts by weight of polychloroprene, and subjecting the composite structure to heat and pressure to vulcanize the assembly.

10. A pneumatic tire having in combination a carcass comprising a sulfur-vulcanized rubbery material and an inner liner ply, said inner liner ply comprising a layer of a rubbery copolymer of an isoolefin having from 4 to 7 carbon atoms with an open-chain conjugated diolefin having from 4 to 8 carbon atoms in face-to-face contact with a layer of cord fabric impregnated with a homogeneous mixture of 20 to 80 parts by weight of said rubbery copolymer with 80 to 20 parts by weight of a rubbery polymer of a chlorobutadiene-1,3, said liner ply and carcass all being integrally bonded together.

11. A pneumatic tire having in combination a carcass comprising a sulfur-vulcanized rubbery material, bead members, and outer bead cushion members comprising a sulfur-vulcanized rubbery material, and an inner liner member in direct adhesive contact with the inner face of said carcass extending around said bead members between said bead members and said bead cushion members, said liner member comprising a core member disposed between a pair of bonding layers in coextensive direct contact therewith, said core member constituting a continuous stratum comprising a rubbery copolymer of a major proportion of an isoolefin having from 4 to 7 carbon atoms with a minor proportion of an open-chain conjugated diolefin having from 4 to 8 carbon atoms, said bonding layers comprising from 40 to 60 parts by weight of said copolymer and from 60 to 40 parts of rubbery polychloroprene.

DONALD V. SARBACH.
GEORGE P. LOOMIS.

(References on following page.)

REFERENCES CITED

The following references are of record in the file of this patent:

UNITED STATES PATENTS

| Number | Name | Date |
|---|---|---|
| 1,171,449 | McGiehan | Feb. 15, 1916 |
| 2,184,326 | Thomas | Dec. 26, 1939 |
| 2,354,426 | Briant | July 25, 1944 |
| 2,405,943 | Doering et al. | Aug. 20, 1946 |
| 2,442,083 | Hall et al. | May 25, 1948 |
| 2,443,678 | Garvey | June 22, 1948 |
| 2,467,322 | Lightbown et al. | Apr. 12, 1949 |
| 2,469,710 | Baldwin | May 10, 1949 |
| 2,471,905 | Smith | May 31, 1949 |